United States Patent
Ishimaru et al.

(10) Patent No.: US 11,536,345 B2
(45) Date of Patent: Dec. 27, 2022

(54) VALVE SEAT MEMBER, VALVE, AND SHOCK ABSORBER

(71) Applicant: KYB Corporation, Tokyo (JP)

(72) Inventors: Kenta Ishimaru, Pamplona (ES); Kazuyuki Kimishima, Gifu (JP); Hirohito Mori, Aichi (JP); Masahiro Miwa, Gifu (JP); Gai Cho, Aichi (JP); Hisato Shii, Gifu (JP); Naoki Yasukouchi, Gifu (JP); Takahiro Owa, Gifu (JP)

(73) Assignee: KYB CORPORATION, Tokyo (JP)

( * ) Notice: Subject to any disclaimer, the term of this patent is extended or adjusted under 35 U.S.C. 154(b) by 31 days.

(21) Appl. No.: 16/979,106

(22) PCT Filed: Mar. 28, 2019

(86) PCT No.: PCT/JP2019/013560
§ 371 (c)(1),
(2) Date: Sep. 8, 2020

(87) PCT Pub. No.: WO2019/189560
PCT Pub. Date: Oct. 3, 2019

(65) Prior Publication Data
US 2020/0400208 A1 Dec. 24, 2020

(30) Foreign Application Priority Data
Mar. 30, 2018 (JP) .............................. JP2018-066714

(51) Int. Cl.
*F16F 9/348* (2006.01)
*F16F 9/32* (2006.01)
*F16F 9/34* (2006.01)
*F16F 9/512* (2006.01)

(52) U.S. Cl.
CPC .......... *F16F 9/3485* (2013.01); *F16F 9/3214* (2013.01); *F16F 9/3405* (2013.01); *F16F 9/5126* (2013.01); *F16F 2222/12* (2013.01)

(58) Field of Classification Search
CPC ...... F16F 9/3485; F16F 9/3214; F16F 9/3405; F16F 9/5126; F16F 2222/12
See application file for complete search history.

(56) References Cited

U.S. PATENT DOCUMENTS

| | | | | |
|---|---|---|---|---|
| 5,595,269 A | * | 1/1997 | Beck | F16F 9/3214 188/282.6 |
| 5,785,160 A | * | 7/1998 | Grundei | F16F 9/3214 188/282.6 |

FOREIGN PATENT DOCUMENTS

| | | | | |
|---|---|---|---|---|
| DE | 19523397 C1 | * | 8/1996 | .............. F16F 9/348 |
| DE | 19523397 C1 | * | 8/1996 | |
| DE | 19615584 A1 | * | 6/1997 | ............ F16F 9/3405 |
| DE | 10041954 C1 | * | 2/2002 | .............. F16F 9/368 |

(Continued)

*Primary Examiner* — Melody M Burch
(74) *Attorney, Agent, or Firm* — Rabin & Berdo, P.C.

(57) ABSTRACT

A valve seat member is provided with: a first seat arranged so as to be spaced apart from an opening of a port; a second seat connected to the first seat at both ends so as to surround the opening of the port; an island portion arranged on the first seat side of the opening of the port in a region surrounded by the first seat and the second seat such that a hollow space is formed between the island portion and the first seat; and a passage configured to extend through the island portion to allow communication between the port and the hollow space.

13 Claims, 7 Drawing Sheets

(56) References Cited

FOREIGN PATENT DOCUMENTS

DE 102016218375 A1 * 3/2018 ............ F16F 9/3485
JP 2009-281488 A 12/2009

* cited by examiner

VALVE SEAT MEMBER, VALVE, AND SHOCK ABSORBER

TECHNICAL FIELD

The present invention relates to improvements in a valve seat member, a valve, and a shock absorber.

BACKGROUND ART

Conventionally, as valve seat members of valves used for, for example, generating a damping force by imparting resistance to a flow of a liquid that is caused during extension/compression of shock absorbers, those disclosed in JP2009-281488A are known. This valve seat member is a so called independent port type in which an opening of each port is surrounded by an annular-shaped first seat and a fan-shaped second seat that is positioned on the circumferentially outer side of the first seat such that both ends thereof are connected to the first seat.

In a case in which leaf valves formed of thin annular-shaped plates are stacked on such a valve seat member and the ports are opened/closed by the leaf valves, inner circumferential portions of the leaf valves are pressed by a spacer member against the first seat and the leaf valves are allowed to be deflected at the circumferentially outer side of the spacer member. With such a configuration, as the pressure on the side of the ports is increased, outer circumferential portions of the leaf valves are deflected about an outer circumferential edge of the spacer member as the fulcrum and are separated from the second seat, and thereby, it is made possible to allow passage of the liquid through thus-made gap.

SUMMARY OF INVENTION

In the valve seat member described above, while the liquid passes through the port, the liquid flowing up from an opening of the port to the side of the leaf valve spreads radially, and flows directed towards the first seat side are generated. Thus, if the liquid contains floating contaminant, there is a risk in that the contaminant is carried by the flow of the liquid directed towards the first seat side, and the contaminant is caught between the seat and the leaf valve at the vicinity of the deflection fulcrum of the leaf valve.

In a state in which the contaminant is caught at the vicinity of the deflection fulcrum, there is a risk in that a gap is formed by the outer circumferential portion of the leaf valve that is lifted up from the second seat all the time, and noise is generated by vibration of the outer circumferential portion of the leaf valve caused by the liquid flowing through the gap.

An object of the present invention is to provide a valve seat member, a valve, and a shock absorber capable of preventing generation of the noise by preventing the contaminant from been trapped.

According to an aspect of the present invention, there is provided a valve seat member including: a main body portion formed with a port, the port opening at a one end portion of the main body; a first seat projecting out from the one end portion of the main body portion, the first seat being arranged so as to be spaced apart from the opening of the port; a second seat projecting out from the one end portion of the main body portion, the second seat being configured such that both ends are connected to the first seat so as to surround the opening of the port; an island portion arranged on the first seat side of the opening of the port in a region surrounded by the first seat and the second seat such that a hollow space is formed between the island portion and the first seat; and a passage formed in the island portion, the passage being configured to allow communication between the port and the hollow space.

DESCRIPTION OF EMBODIMENT

An embodiment of the present invention will be described below with reference to the drawings. The same reference sings given throughout some of the figures in the drawings indicate the same components (parts) or the corresponding components (parts).

Figure 1:
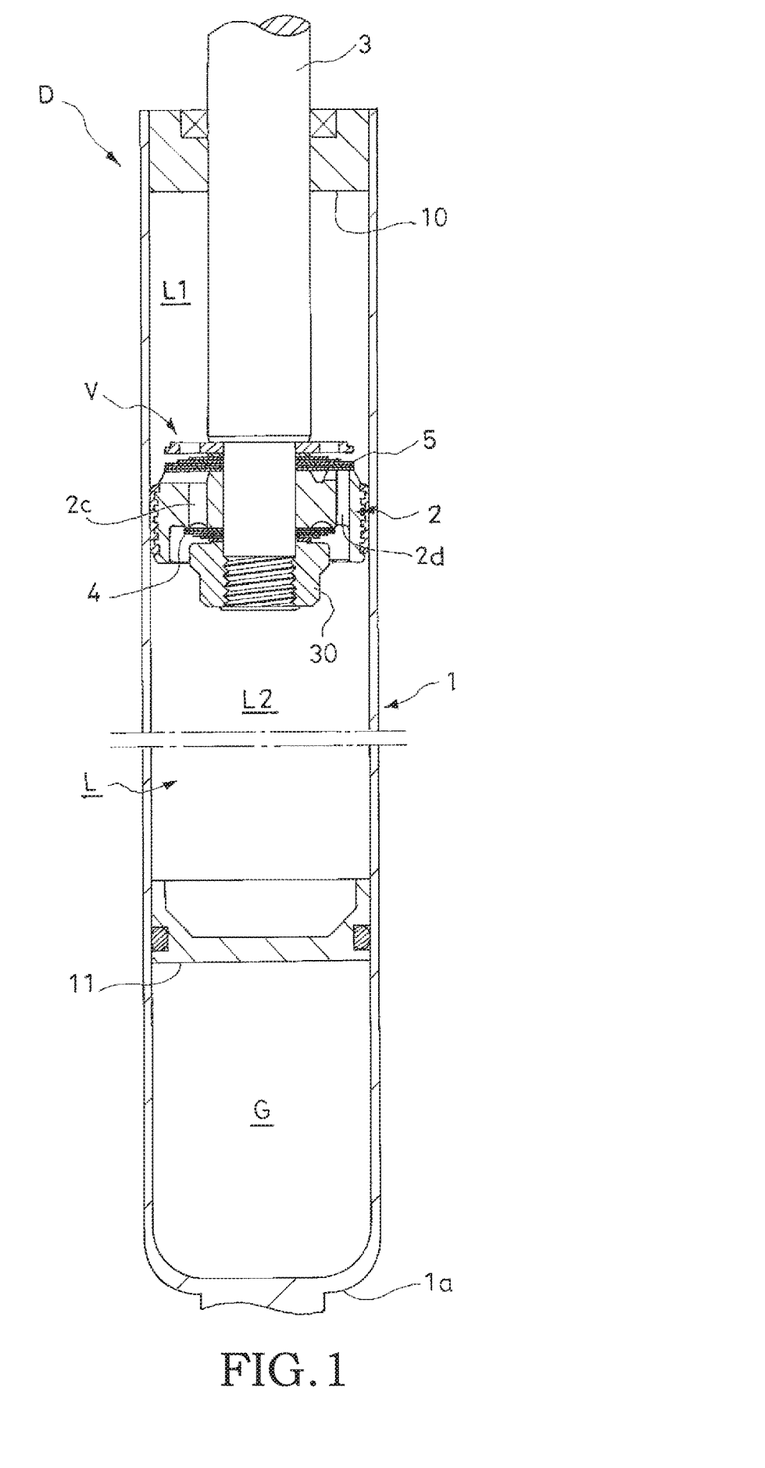
FIG. 1 is a longitudinal sectional view showing a shock absorber including a piston that is a valve seat member according to the embodiment of the present invention.

As shown in FIG. 1, the valve seat member according to the embodiment of the present invention is used as a piston 2 of a shock absorber D and forms, together with leaf valves 4 and 5, etc., a damping valve V. The shock absorber D is interposed between a vehicle body of a vehicle, such as an automobile, and an axle. In the following description, for the sake of convenience of description, the top and bottom of the shock absorber D shown in FIG. 1 are referred to simply as "up" and "down", unless an explicit description is specifically given.

An installation target of the shock absorber provided with the valve seat member according to the present invention is not limited to the vehicle, and it may be changed appropriately. In addition, the vertical orientation of the shock absorber in an installed state may be, of course, appropriately inverted in accordance with the installation target. Specifically, the shock absorber D of this embodiment may be installed to the vehicle in the same orientation as that in FIG. 1, or the shock absorber D may be installed to the vehicle in the vertically inverted orientation from the orientation shown in FIG. 1.

A specific structure of the shock absorber D according to this embodiment will be described below. As shown in FIG. 1, the shock absorber D is provided with a cylinder tube 1 having a bottomed cylinder shape, the piston 2 that is inserted into the cylinder tube 1 in a freely slidable manner, and a piston rod 3 that is linked to the piston 2 at its lower end such that an upper end thereof projects out from the cylinder tube 1.

A bracket (not shown) is provided on the upper end of the piston rod 3, and the piston rod 3 is linked to the one of the vehicle body and the axle via the bracket. In addition, a bracket (not shown) is also provided on a bottom portion 1a of the cylinder tube 1, and the cylinder tube 1 is linked to the other of the vehicle body and the axle via the bracket.

As described above, the shock absorber D is interposed between the vehicle body and the axle. When wheels are vibrated vertically relative to the vehicle body as the vehicle travels on an irregular road surface, for example, the piston rod 3 is moved into and out from the cylinder tube 1, and thereby, the shock absorber D is extended/compressed and the piston 2 is moved vertically (in the axial direction) within the cylinder tube 1.

In addition, the shock absorber D is provided with an annular-shaped cylinder head 10 that seals an upper end of the cylinder tube 1 and that supports the piston rod 3 in a freely slidable manner. A lower end of the cylinder tube 1 is sealed by the bottom portion 1a. In this way, an interior of the cylinder tube 1 is formed as a sealed space. In the cylinder tube 1, a free piston 11 is inserted in a freely slidable manner on the opposite side of the piston rod 3 with respect to the piston 2 in the cylinder tube.

A liquid chamber L is formed above the free piston 11 in the cylinder tube 1 (in other words, between the free piston 11 and the cylinder head 10), and a gas chamber G is formed under the free piston 11 (in other words, between the free piston 11 and the bottom portion 1a of the cylinder tube 1). The liquid chamber L is partitioned by the piston 2 into an extension-side chamber L1 on the piston rod 3 side and a compression-side chamber L2 on the piston 2 side. The extension-side chamber L1 and the compression-side chamber L2 are respectively filled with liquid, such as working oil, etc. The gas chamber G is filled with gas, such as air, nitrogen gas, or the like, in a compressed state.

When the shock absorber D is extended, the piston rod 3 moves out from the cylinder tube 1, and the volumetric capacity in the cylinder tube 1 is increased by an amount corresponding to the volume of the piston rod 3 that has moved out. As a result, the free piston 11 is moved upward within the cylinder tube 1 so as to cause the gas chamber G to be expanded. In contrast, when the shock absorber D is compressed, the piston rod 3 moves into the cylinder tube 1, and the volumetric capacity in the cylinder tube 1 is decreased by an amount corresponding to the volume of the piston rod 3 that has moved in. As a result, the free piston 11 is moved downward within the cylinder tube 1 so as to cause the gas chamber G to be contracted.

In the above configuration, instead of using the free piston 11, a bladder, bellows, or the like may be used to partition the liquid chamber L and the gas chamber G. The configuration of a movable partition wall functioning as the partition may be modified appropriately.

Furthermore, in this embodiment, the shock absorber D is of a single rod, mono-tube type. When the shock absorber D is extended/compressed, the gas chamber G is expanded/contracted by the free piston (the movable partition wall) 11, and thereby, the volume of the piston rod 3 moving into and out from the cylinder tube 1 is compensated for. In contrast, the configuration for the volume compensation may be modified appropriately.

For example, the free piston (the movable partition wall) 11 and the gas chamber G may be omitted, and the shock absorber may be formed as a multi-tube type by providing an outer shell on an outer circumference of the cylinder tube 1, and thereby, a reservoir chamber that stores the liquid between the cylinder 1 and the outer shell may be formed. In this case, the volume compensation is achieved by the reservoir chamber. Furthermore, the reservoir chamber may be formed in a tank that is provided separately from the cylinder tube 1.

In addition, the shock absorber may be formed as a twin rod type by providing piston rods on both sides of the piston. In such a case, it is not necessary to achieve the volume compensation for the piston rods itself.

The piston 2 is held on an outer circumference of the piston rod 3 by a nut 30 together with the extension-side and compression-side leaf valves 4 and 5 that are respectively stacked on and under the piston 2. As described above, the piston 2 functions as the valve seat member on which valve bodies such as the leaf valve, etc. are mounted, and the piston 2 forms, together with the valve bodies, the damping valve V. Respective members forming the damping valve V will be described in detail below.

Figure 2:
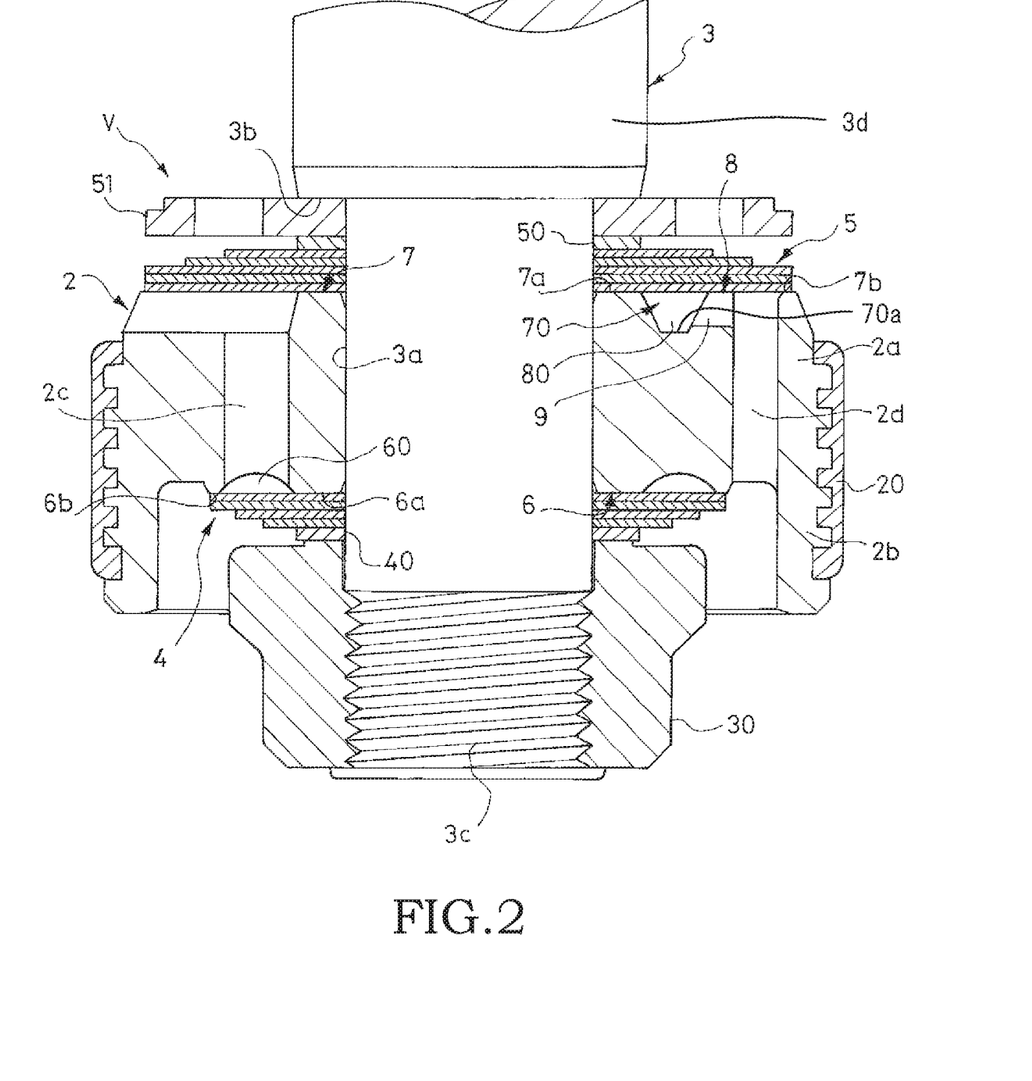
FIG. 2 is a longitudinal sectional view showing, in enlargement, a portion of FIG. 1.

As shown in FIG. 2, the piston 2 is provided with an annular-shaped main body portion 2a and a cylindrical skirt portion 2b that projects downwards from a lower end outer circumferential portion of the main body portion 2a. A piston band 20 is wrapped around an outer circumference of the piston 2. The piston 2 is in sliding contact with an inner circumference of the cylinder tube 1 via the piston band 20.

The main body portion 2a of the piston 2 is formed with extension-side and compression-side ports 2c and 2d that open at an upper end portion (one end portion) of the main body portion 2a and at a lower end portion of the main body portion 2a on an circumferentially inner side of the skirt portion 2b. At least one extension-side leaf valves 4 (there are four leaf valves in FIG. 2) are stacked on the lower end portion of the main body portion 2a in the axial direction of the main body portion 2a (in the vertical direction in FIG. 2). The extension-side ports 2c are opened/closed by the extension-side leaf valves 4. At least one compression-side leaf valves 5 (there are five leaf valves in FIG. 2) are stacked on the upper end portion of the main body portion 2a in the axial direction of the main body portion 2a. The compression-side ports 2d are opened/closed by the compression-side leaf valves 5.

The extension-side and compression-side leaf valves 4 and 5 are each formed of a metallic thin annular-shaped plate and has an elasticity. An annular-shaped spacer member 40 is stacked on the lower side of the extension-side leaf valves 4. In other words, the extension-side leaf valves 4 are sandwiched by the spacer member 40 and the piston 2. The outer diameter of the spacer member 40 is smaller than the outer diameters of the respective extension-side leaf valves 4. On the upper side of the compression-side leaf valves 5, an annular-shaped spacer member 50 and a valve stopper 51 are stacked in this order from the piston 2 side. In other words, the compression-side leaf valves 5 are sandwiched by the spacer member 50 and the piston 2. The outer diameter of the spacer member 50 is smaller than the outer diameters of the respective compression-side leaf valves 5.

As described above, the damping valve V has the piston 2, the extension-side and compression-side leaf valves 4 and 5, the spacer members 40 and 50, and the valve stopper 51, and the damping valve V is held by the nut 30 on an outer circumference of an attachment shaft 3a provided on a tip end of the piston rod 3.

More specifically, the outer diameter of the attachment shaft 3a is formed so as to be smaller than the outer diameter of a directly-above-portion 3d (a part adjacent to the attachment shaft 3a from the upper side thereof). An annular-shaped step 3b is formed on a boundary between the attachment shaft 3a and the directly-above-portion 3d. A thread groove 3c is formed on an outer circumference of a tip end portion of the attachment shaft 3a such that the nut 30 can be threaded therewith. By inserting the attachment shaft 3a into the center portion of the damping valve V and tightening the nut 30, the damping valve V is held on the outer circumference of the attachment shaft 3a in a state in which an inner circumferential portion of the damping valve V is sandwiched between the nut 30 and the step 3b.

In addition, even in a state in which the damping valve V is mounted on the piston rod 3, the extension-side leaf valves 4 can be deflected downward at the circumferentially outer side of the spacer member 40 about an outer circumferential edge of the spacer member 40 as the fulcrum. Similarly, the compression-side leaf valves 5 can be deflected upward at the circumferentially outer side of the spacer member 50 about an outer circumferential edge of the spacer member 50 as the fulcrum.

The piston 2 is provided with an extension-side seat portion 6 that projects downward from the lower end portion of the main body portion 2a such that a seat surface on which the extension-side leaf valves 4 are seated is formed on a tip end (a lower end) and a compression-side seat portion 7 that project upward from the upper end portion of the main body portion 2a such that a seat surface on which the compression-side leaf valves 5 are seated is formed on a tip end (an upper end). The extension-side seat portion 6 includes a first seat 6a serving as an annular-shaped inner circumference seat that projects downward in the axial direction of the piston 2 from the lower end portion of the main body portion 2a and that is positioned on the circumferentially inner side of the main body portion 2a and a second seat 6b serving as an outer circumference seat that projects downward in the axial direction of the piston 2 from the lower end portion and that is positioned on the circumferentially outer side of the first seat 6a. Similarly, the compression-side seat portion 7 includes a first seat 7a serving as an annular-shaped inner circumference seat that projects upward in the axial direction of the piston 2 from the upper end portion of the main body portion 2a and that is positioned on the circumferentially inner side of the main body portion 2a and a second seats 7b serving as an outer circumference seat that projects upward in the axial direction of the piston 2 from the upper end portion and that is positioned on the circumferentially outer side of the first seat 7a.

The extension-side ports 2c open in a window 60 in the extension-side seat portion 6 surrounded by the first seat 6a and the second seat 6b. The compression-side ports 2d open in a window 70 in the compression-side seat portion 7 surrounded by the first seat 7a and the second seats 7b. In addition, an island portion 8 is provided in the window 70 in the compression-side seat portion 7. In other words, in this embodiment, the first seat 7a, the second seats 7b, and the island portion 8 are provided on the upper end portion of the main body portion 2a so as to project out in the axial direction of the piston 2 from an end surface (a bottom surface 70a of the window 70) of the upper end portion of the main body portion 2a in which the ports 2d open. The compression-side leaf valves 5 are also supported by the island portion 8. As described above, in this embodiment, the seat surface is also formed on a tip end (an upper end) of the island portion 8, and the island portion 8 functions as an auxiliary component for the compression-side seat portion 7.

Figure 3:
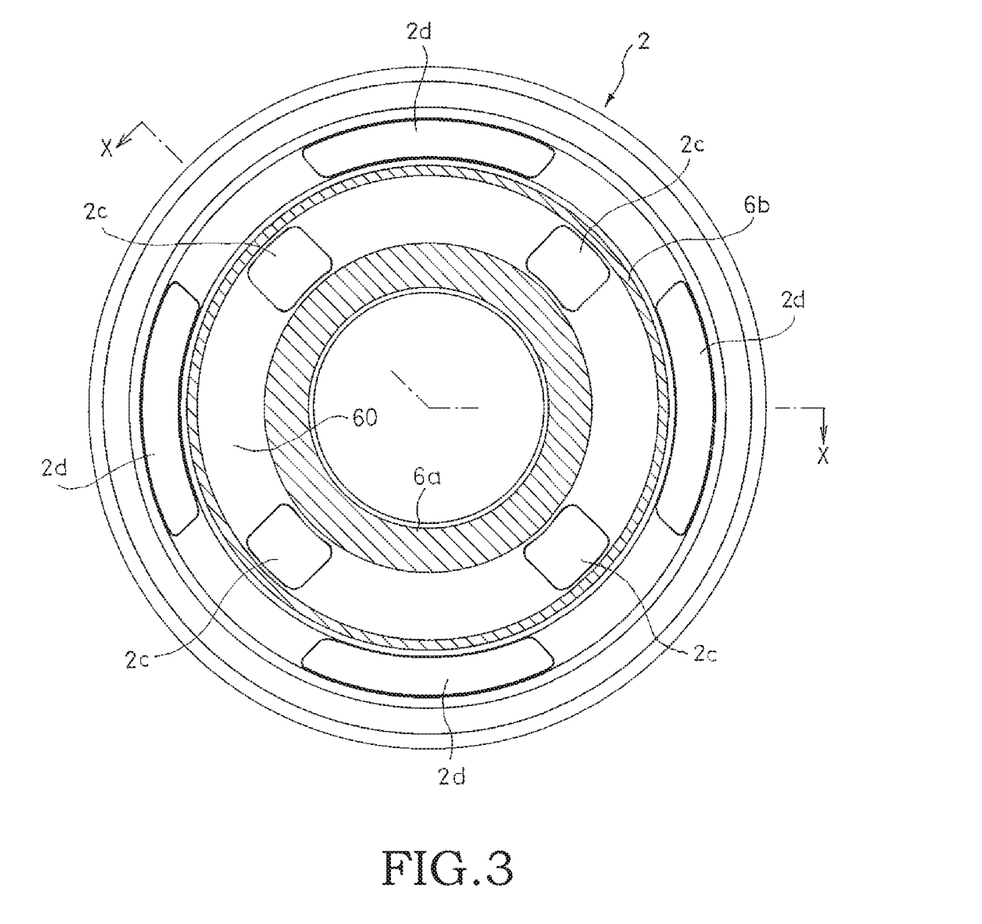
FIG. 3 is a bottom view of the piston that is the valve seat member according to the embodiment of the present invention.

FIG. 3 shows a bottom view of the piston 2. In FIG. 3, the seat surfaces of the extension-side seat portion 6 are illustrated by the hatching. In other words, the hatchings shown in FIG. 3 do not show cross-sections. In addition, FIG. 2 shows a cross-section taken along a line X-X in the piston 2 shown in FIG. 3.

As shown in FIG. 3, in this embodiment, the second seat 6b in the extension-side seat portion 6 has an annular shape and is arranged on the circumferentially outer side of the first seat 6a so as to form an annular-shaped gap with the first seat 6a. The annular-shaped window 60 is formed between the first seat 6a and the second seat 6b.

In addition, in this embodiment, four extension-side ports 2c are formed so as to be aligned along the circumferential direction of the piston 2, and all of the extension-side ports 2c open within the window 60. As described above, the second seat 6b of the extension-side seat portion 6 is arranged so as to surround all openings of the extension-side ports 2c, as a whole.

In addition, as illustrated by the hatching in FIG. 3, each of the seat surfaces of the first seat 6a and the second seat 6b in the extension-side seat portion 6 has an annular shape. As shown in FIG. 2, the seat surface of the first seat 6a faces the spacer member 40 with the extension-side leaf valves 4 being sandwiched therebetween, and inner circumferential portions of the extension-side leaf valves 4 are pressed against the seat surface of the first seat 6a. The inner diameter of a seat surface of the second seat 6b is larger than the outer diameter of the spacer member 40, and outer circumferential portions of the extension-side leaf valves 4 are seated on and separated from the seat surface of the second seat 6b. With such a configuration, the extension-side ports 2c are opened/closed by the extension-side leaf valves 4.

In addition, as shown in FIG. 3, in this embodiment, four compression-side ports 2d are formed so as to be aligned along the circumferential direction on the circumferentially outer side of the extension-side ports 2c in the piston 2. All of the compression-side ports 2d open on the circumferentially outer side of the seat surface of the second seat 6b. Therefore, the extension-side leaf valves 4 do not close the compression-side ports 2d, and the compression-side ports 2d are in communication with the compression-side chamber L2 all the time.

Figure 4:
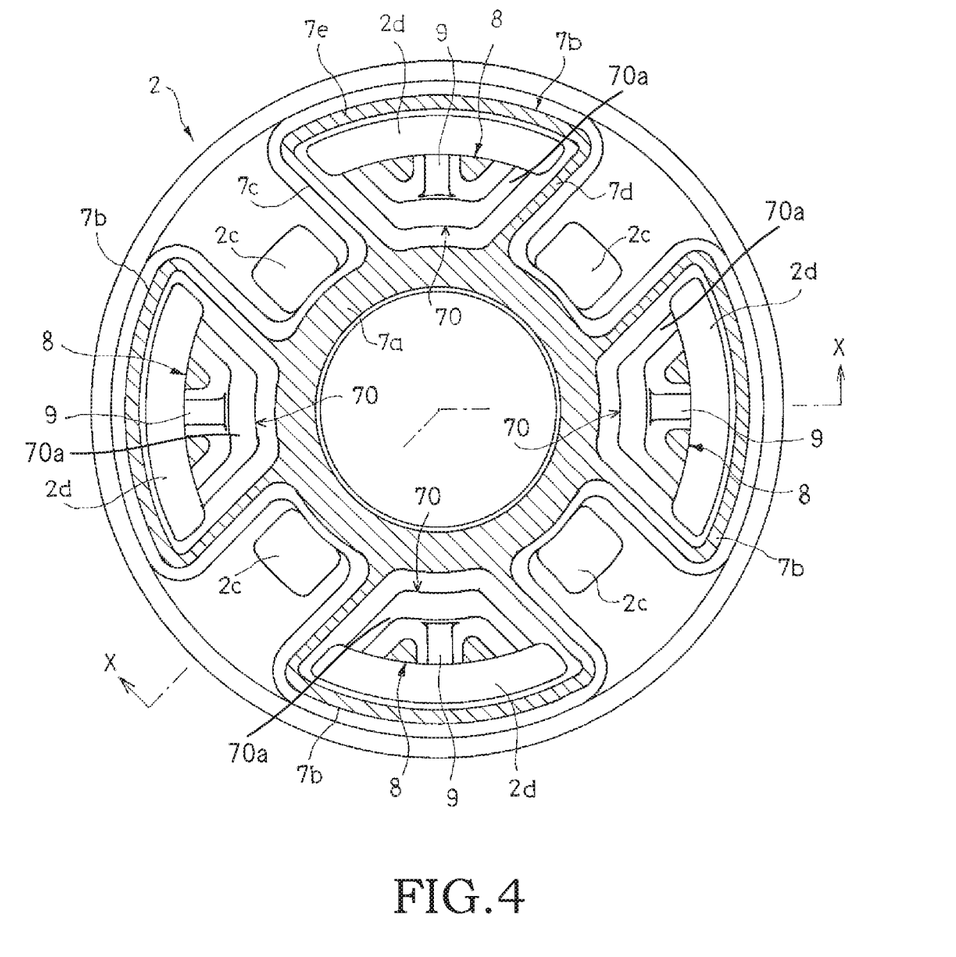
FIG. 4 is a plan view of the piston that is the valve seat member according to the embodiment of the present invention.

FIG. 4 shows a plan view of the piston 2. In FIG. 4, the seat surfaces of the compression-side seat portion 7 and the island portion 8 are respectively illustrated by the hatching. In other words, the hatchings shown in FIG. 4 do not show cross-sections. In addition, in FIG. 4, the line X-X is the line corresponding to the line X-X in FIG. 3.

As shown in FIG. 4, in this embodiment, the second seats 7b are provided at the same number as the number of compression-side ports 2d, and the second seats 7b are formed so as to be aligned along the circumferential direction on the circumferentially outer side of the first seat 7a. In addition, each of the second seats 7b includes a pair of linear side portions 7c and 7d that are connected to the first seat 7a at tail ends thereof and that separate away from each other towards the outer circumference of the piston 2 and an arc-shaped outer circumferential portion 7e that connects the tip ends of the side portions 7c and 7d.

As described above, the pair of side portions 7c and 7d located on both sides of each second seat 7b are connected to the first seat 7a at the tail ends thereof, and the window 70 having a fan shape is formed between the first seat 7a and each of the second seats 7b. The single compression-side port 2d opens in the single window 70. In other words, the second seats 7b of the compression-side seat portion 7 are respectively arranged so as to individually surround each of the four compression-side ports 2d, and thereby, the compression-side ports 2d are respectively made independent from each other.

In addition, as illustrated by the hatching in FIG. 4, the seat surface of the first seat 7a of the compression-side seat portion 7 has an annular shape, and the seat surfaces of the second seats 7b have the fan shape. As shown in FIG. 2, the seat surface of the first seat 7a faces the spacer member 50 with the compression-side leaf valves 5 being sandwiched therebetween, and inner circumferential portions of the compression-side leaf valves 5 are pressed against the seat surface of the first seat 7a. The inner diameter of the seat surface of the outer circumferential portion 7e of the second seats 7b is larger than the outer diameter of the spacer member 50, and outer circumferential portions of the compression-side leaf valves 5 are seated on and separated from the seat surfaces of the second seats 7b. With such a configuration, the compression-side ports 2d are opened/closed by the compression-side leaf valves 5.

In addition, as shown in FIG. 4, in this embodiment, the extension-side ports 2c and the compression-side ports 2d are arranged alternately in the circumferential direction of the piston 2. The four extension-side ports 2c respectively open between the second seats 7b and 7b adjacent to each other. Therefore, the compression-side leaf valves 5 do not close the extension-side ports 2c, and the extension-side ports 2c are in communication with the extension-side chamber L1 all the time.

According to the configuration described above, when the shock absorber D is extended, the piston rod 3 moves out from the cylinder tube 1, and the piston 2 moves upward in the cylinder tube 1, thereby compressing the extension-side chamber L1. Thus, the pressure in the extension-side chamber L1 is increased, and the pressure is applied via the extension-side ports 2c in the direction in which the outer circumferential portions of the extension-side leaf valves 4 are deflected downward.

As the outer circumferential portions of the extension-side leaf valves 4 are deflected, a gap is formed between the outer circumferential portions and the second seat 6b, and the liquid in the extension-side chamber L1 is moved to the compression-side chamber L2 through the extension-side ports 2c. Resistance is imparted to such a flow of the liquid by the extension-side leaf valves 4. Therefore, when the shock absorber D is extended, a extension-side damping force is generated by the resistance imparted by the extension-side leaf valves 4.

In contrast, when the shock absorber D is compressed, the piston rod 3 moves into the cylinder tube 1, and the piston 2 moves downward in the cylinder tube 1, thereby compressing the compression-side chamber L2. Thus, the pressure in the compression-side chamber L2 is increased, and the pressure is applied via the compression-side ports 2d in the direction in which the outer circumferential portions of the compression-side leaf valves 5 are deflect upward.

As the outer circumferential portions of the compression-side leaf valves 5 are deflected, a gap is formed between the outer circumferential portion of the compression-side leaf valves 5 and the second seats 7b, and the liquid in the compression-side chamber L2 is moved to the extension-side chamber L1 through the compression-side ports 2d. Resistance is imparted to such a flow of the liquid by the compression-side leaf valves 5. Therefore, when the shock absorber D is compressed, a compression-side damping force is generated by the resistance imparted by the compression-side leaf valves 5.

Here, for ease of understanding the present invention, a comparative example of this embodiment will be described with reference to FIG. 7.

Figure 7:
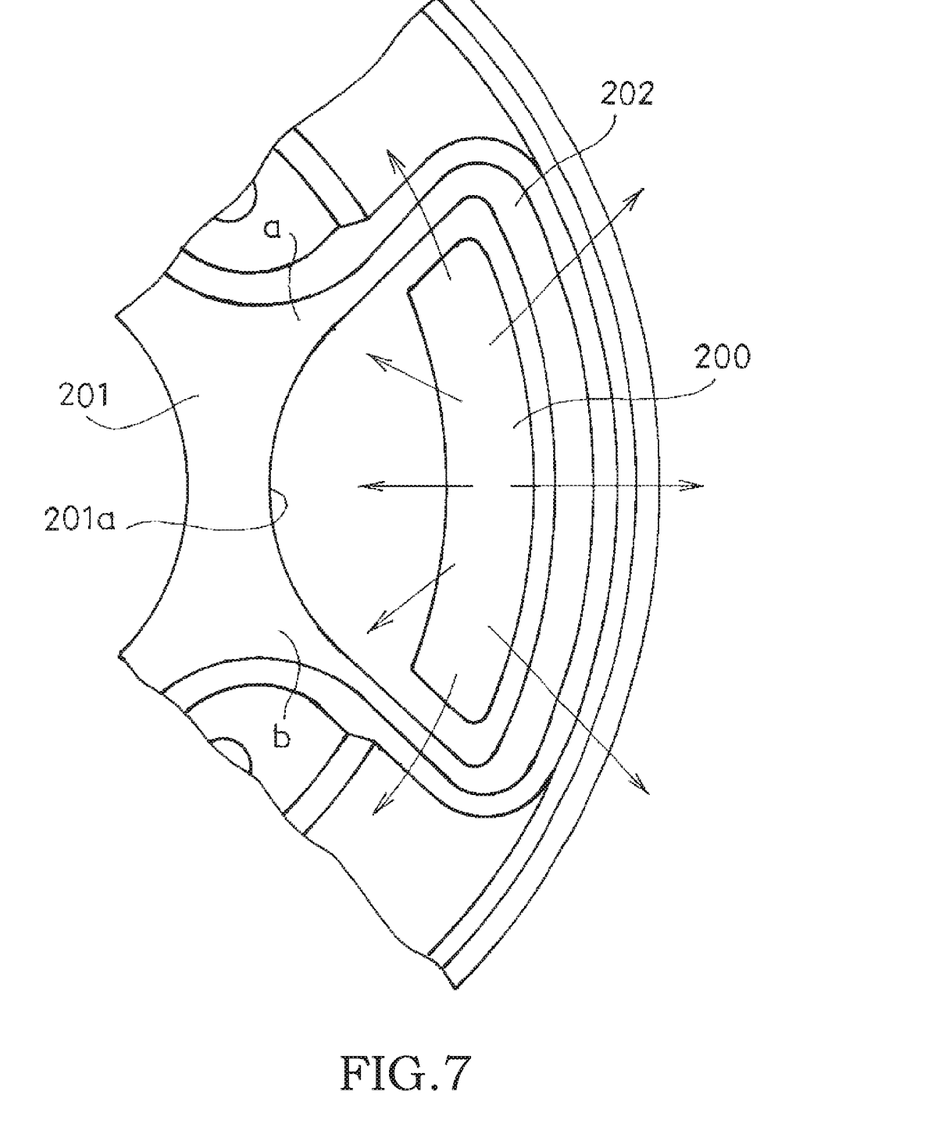
FIG. 7 is an explanatory diagram showing a flow of a liquid passing through a port of a valve seat member according to a comparative example.

The valve seat member according to the comparative example is a so called independent port type in which, as shown in FIG. 7, an opening of a single port 200 is surrounded by an annular-shaped first seat 201 and a fan-shaped second seat 202 that is positioned on the circumferentially outer side of the first seat 201 and that is connected to the first seat 201 at both ends.

In the valve seat member, in a case in which leaf valves formed of thin annular-shaped plates are stacked and the leaf valves are used to open/close the port 200, inner circumferential portions of the leaf valves are pressed by a spacer member against the first seat 201 and the leaf valves are allowed to be deflected on the circumferentially outer side of the spacer member. Thus, as the pressure on side of the port 200 is increased, the outer circumferential portions of the leaf valves are deflected about the outer circumferential edge of the spacer member as the fulcrum and are separated from the second seat 202, and thereby, it is made possible to allow passage of the liquid through thus-made gap.

With this valve seat member, while the liquid passes through the port 200, as shown by arrows in FIG. 7, the liquid flowing up from the opening of the port 200 to the side of the leaf valves spreads radially, and flows directed towards the first seat 201 side are generated. Thus, if the liquid contains floating contaminant, there is a risk in that the contaminant is carried by the flow of the liquid directed towards the first seat 201 side, and the contaminant is caught between the first seat 201 and the leaf valves at the vicinity of the deflection fulcrum of the leaf valves.

More specifically, assuming that the surface of the first seat 201 on which the leaf valves are seated as the seat surface, the seat surface has an annular shape, and in general, the outer diameter of the seat surface is substantially the same as the outer diameter of the spacer member. Therefore, with the valve seat member according to the comparative example, the vicinity of an outer circumferential edge 201a of the seat surface of the first seat 201 faces the deflection fulcrum of the leaf valves, and there is a risk in that the contaminant is caught between the leaf valves and branch portions a and b of the second seat 202 branched from the first seat 201 at the vicinity of the deflection fulcrum.

The contaminant that has been caught at the vicinity of the deflection fulcrum as described above cannot be released unless a large deflected amount is caused on the leaf valves, and it may even be possible for the contaminant to be caught firmly even further by being pushed toward the first seat 201 side by the flow of the liquid flowing towards the first seat 201. Therefore, once the contaminant is caught at the vicinity of the deflection fulcrum, it is very difficult for the contaminant to be released. Thus, in a state in which the contaminant has been caught as described above, the outer circumferential portions of the leaf valves are lifted up all the time from the second seat 202 to form a gap therebetween. As a result, there is a risk in that a noise is generated by vibration of the outer circumferential portions of the leaf valves caused by the liquid flowing through the gap.

Figure 5:
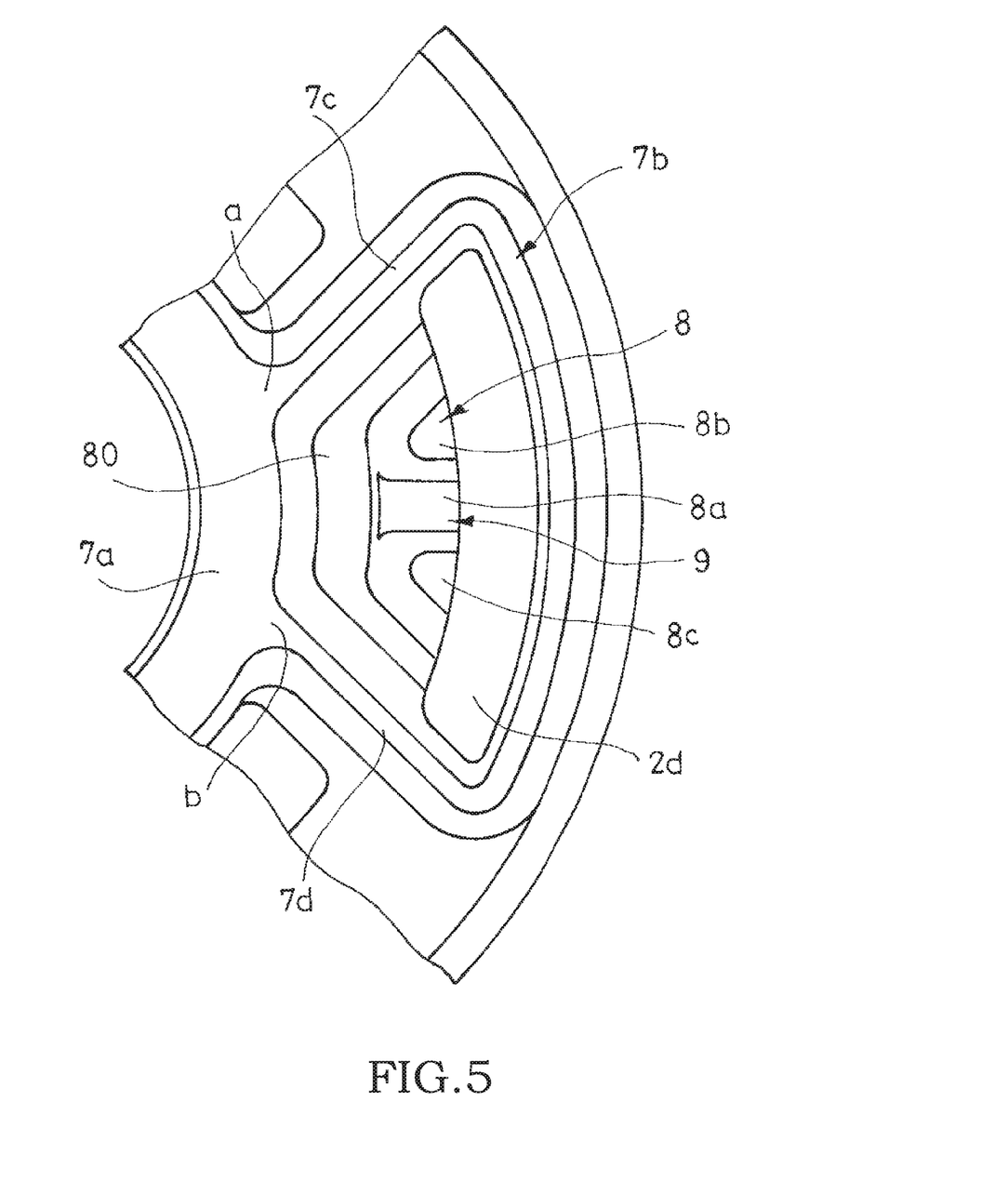
FIG. 5 is a partially enlarged view showing, in enlargement, a portion of FIG. 4.

In contrast, in this embodiment, as shown in FIG. 4, the piston 2 has the island portions 8 respectively arranged between the first seat 7a and each of the second seats 7b in the compression-side seat portion 7. As shown in FIG. 5, each of the island portions 8 is arranged so as to form a gap with the first seat 7a, and a hollow space 80 is formed between the first seat 7a and the island portion 8. In addition, a recessed portion 8*a* is formed in a tip end of the island portion 8, and the island portion 8 is equally split by the boundary recessed portion 8*a* into two small islands 8*b* and 8*c* that are aligned in the circumferential direction of the first seat 7*a*. A passage 9 through which the compression-side ports 2*d* and the hollow space 80 are communicated is formed by the recessed portion 8*a*.

Figure 6:
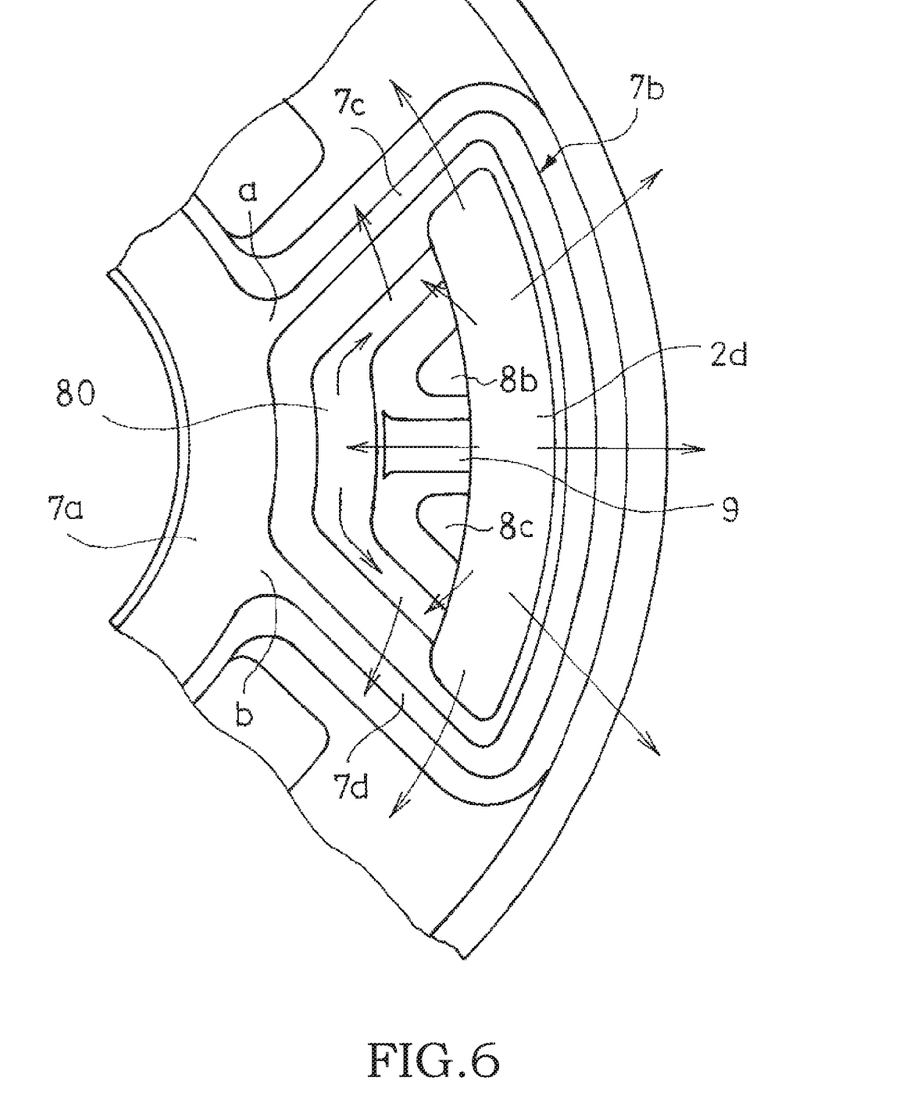
FIG. 6 is an explanatory diagram showing a flow of a liquid passing through a compression-side port of the piston that is the valve seat member according to the embodiment of the present invention.

Thus, as shown in FIG. 6, when the shock absorber D is compressed, among the liquid flowing up from the opening of the compression-side port 2*d* to the side of the compression-side leaf valves 5, the liquid directed toward the first seat 7*a* side flows so as to bypass the two small islands 8*b* and 8*c*. As a part of the liquid passes through the passage 9 and hits the first seat 7*a*, the liquid is split into two flows to form the flows flowing in the direction away from the first seat 7*a* from the vicinity of the tail ends of both of the side portions 7*c* and 7*d* of the second seats 7*b*. Thus, even if the liquid contains the floating contaminant, the contaminant is discharged toward the circumferentially outer side of the piston 2.

With such a configuration, as shown in FIG. 2, even in a case in which the outer diameter of the seat surface of the first seat 7*a* is substantially the same as the outer diameter of the spacer member 50, and in which the vicinity of the outer circumferential edge of the seat surface of the first seat 7*a* faces the deflection fulcrum of the compression-side leaf valves 5, the contaminant becomes less likely to be caught between the compression-side leaf valves 5 and the branch portions a and b of the second seat 7*b* (FIG. 6) that are located in the vicinity of the deflection fulcrum and branched from the first seat 7*a*.

Furthermore, the tip end (the seat surface) of the island portion 8 is positioned on the circumferentially outer side of the outer circumferential edge of the spacer member 50 in the piston 2, and when viewed from the axial direction, the spacer member 50 and the tip end of the island portion 8 are arranged so as to form a gap therebetween in the radial direction of the piston 2. Because the tip end of the island portion 8 is provided at the position spaced apart from the deflection fulcrum of the compression-side leaf valves 5, even if the island portion 8 is provided, when the compression-side leaf valves 5 are deflected, a sufficient gap is formed between the compression-side leaf valves 5 and the island portion 8. Therefore, the contaminant is also not caught between the island portion 8 and the compression-side leaf valves 5.

In addition, in this embodiment, when viewed from the axial direction, the island portion 8 is positioned at the center portion of the window 70, and the passage 9 penetrates through the center of the island portion 8 in the radial direction of the piston 2. With the above-described configuration, an opening of the passage 9 directed toward the circumferentially inner side of the piston 2 faces the outer circumference of the first seat 7*a*, i.e. the center portion in the circumferential direction between joint portions a and b to which both ends of the second seats 7*b* (the tail ends of the pair of side portions 7*c* and 7*d*) are connected.

Therefore, when the liquid hits the first seat 7*a* by being directed toward the first seat 7*a* from the compression-side ports 2*d* through the passage 9 and is split into the first-side side portion 7*c* side and the second-side side portion 7*d* side at the hollow space 80 so as to be directed in the directions away from the first seat 7*a*, the flow amount of the liquid is prevented from being biased to one of the side portions. Thus, the contaminant becomes less likely to be caught between the compression-side leaf valves 5 and both of the joint portion (the branch portion) a of the first-side side portion 7*c* and the joint portion (the branch portion) b of the second-side side portion 7*d*, which are branched from the first seat 7*a*.

Operational advantages of the piston 2 serving as the valve seat member according to this embodiment, the damping valve (valve) V including the piston 2, and the shock absorber D provided with the damping valve V will be described below.

In this embodiment, the piston (the valve seat member) 2 is provided with the first seat 7*a* arranged so as to be spaced apart from the opening of the compression-side port (ports) 2*d*; the second seat 7*b* configured such that the both ends are connected to the first seat 7*a* so as to surround the opening of the compression-side port 2*d*; the island portion 8 arranged on the first seat 7*a* side of the opening of the compression-side port 2*d* in a region surrounded by the first seat 7*a* and the second seat 7*b* such that the hollow space 80 is formed between the island portion 8 and the first seat 7*a*; and the passage 9 configured to extend through the island portion 8 to allow communication between the compression-side ports 2*d* and the hollow space 80.

According to the above-described configuration, in a case in which the compression-side ports 2*d* are opened/closed by the compression-side leaf valves 5 stacked on the piston 2, as the liquid passes through the port 2*d*, a part of the liquid flowing up from the opening of the port 2*d* to the compression-side leaf valves 5 side flows through the passage 9. The liquid flowing through the passage 9 hits the first seat 7*a* and is split into two flows in the hollow space 80, thereby causing flows flowing in the directions away from the first seat 7*a*.

Therefore, even if the liquid contains the floating contaminant, the contaminant is discharged to the circumferentially outer side by the flows flowing in the direction away from the first seat 7*a*. Thus, it is possible to prevent generation of the noise by preventing the contaminant from being caught at the vicinity of the deflection fulcrum of the compression-side leaf valves 5.

In addition, in this embodiment, with reference to the end surface 70*a* at which the ports 2*d* are opened, the height of the first seat 7*a* and the height of the second seats 7*b* in the compression-side seat portion 7 are the same with each other. In addition, the height of the island portion 8 from the end surface 70*a* is the same as the heights of the first seat 7*a* and the second seats 7*b*. In other words, the tip end of the island portion 8 is configured such that the position thereof in the axial direction of the piston 2 is positioned on an imaginary plane including a tip end of the first seat 7*a* and a tip end of the second seats 7*b* (in this embodiment, a plane orthogonal to the center axis of the piston 2, and this plane corresponds to a lower end surface of the leaf valve 5). Therefore, the island portion 8 can function as the auxiliary component that supports the compression-side leaf valves 5 at the inner side of the compression-side seat portion 7, and it is possible to improve the durability of the compression-side leaf valve 5 because the compression-side leaf valves 5 that would be deflected by a back pressure to the lower side can be supported by the island portion 8. In the above, the heights of the island portion 8, the first seat 7*a*, and the second seats 7*b* from the end surface 70*a* respectively mean lengths between the end surface 70*a* and the tip ends of the island portion 8, the first seat 7*a*, and the second seats 7*b* in the direction perpendicular to the end surface 70*a* (the axial direction of the piston 2).

In addition, the island portion 8 may be configured so as to be slightly lower than the first seat 7*a* and the second seats 7*b*. Also in this case, it is possible to achieve the above-described effect. Furthermore, in order to allow the compression-side leaf valves 5 to be seated on the first seat 7a and the second seats 7b with reliability, it suffices that the height of the island portion 8 is equal to or lower than the heights of the first seat 7a and the second seats 7b, and the island portion 8 may not function as the auxiliary component. In other words, it suffices that the tip end of the island portion 8 is configured such that the position thereof in the axial direction of the piston 2 is positioned on the plane including the tip end of the first seat 7a and the tip end of the second seats 7b, or positioned on the end surface 70a side of the plane (the lower side in FIG. 2). Furthermore, it suffices that the island portion 8 is configured so as not to project upward in the axial direction of the piston 2 over the first seat 7a and the second seats 7b from the end surface 70a. With such a configuration, when the leaf valves 5 are stacked on the piston 2, it is possible to allow the leaf valves 5 to be seated on the first seat 7a and the second seats 7b with reliability.

In addition, in this embodiment, the passage 9 through which the compression-side ports 2d communicate with the hollow space 80 is formed by the recessed portion 8a formed in the tip end of the island portion 8. Therefore, even if the island portion 8 is small, it is possible to easily form the passage 9. Furthermore, in a case in which the island portion 8 functions as the auxiliary component, because a contact area between the island portion 8 and the compression-side leaf valves 5 can be made small, it is possible to reduce the noise caused when the compression-side leaf valves 5 come into contact with the island portion 8.

In addition, in this embodiment, the opening of the passage 9 on the hollow space 80 side (the opening of the passage 9 toward the hollow space 80) faces the center portion at the center between the joint portions to which the tail ends (both ends) of the pair of side portions 7c and 7d of the second seats 7b in the first seat 7a are connected.

Therefore, when the liquid that has passed the passage 9 is split in the hollow space 80 into two flows directed towards the joint portions that are both ends of the second seats 7b so as to be directed to the direction away from the first seat 7a, it is possible to allow the liquid to be distributed to the respective joint portions evenly. Thus, it is possible to respectively suppress trapping of the contaminant between the compression-side leaf valves 5 and the branch portion a of the first-side side portion 7c and the branch portion b of the second-side side portion 7d, which are branched from the first seat 7a, in the second seats 7b.

In addition, in this embodiment, the side surface of the island portion 8 facing the opening of the compression-side port (port) 2d is formed so as to be flush with the inner wall of the compression-side ports 2d in continuous with the side surface (FIG. 2). The term "flush" means a state in which no step is formed between adjacent surfaces. In other words, the side surface of the island portion 8 and the inner wall of the compression-side ports 2d are formed so as to be connected smoothly without forming a step. With such a configuration, when the piston 2 is formed by using a mold, it is possible to use the mold with no step in a boundary portion between the side surface of the island portion 8 and the inner wall of the compression-side ports 2d in continuous therewith. Therefore, it is easy to form the piston 2 using the mold, and it is possible to form the piston 2 with a high forming accuracy.

The configurations of the island portion 8 and the passage 9 can be modified appropriately as long as the flow of the liquid flowing in the direction away from the first seat 7a can be formed. For example, it may be possible to form a through hole penetrating through the island portion 8 in the radial direction of the piston 2, and the passage 9 may be formed by this through hole. In addition, the passage 9 may be formed by a penetrating portion that penetrates the piston 2 in the axial direction by being integrated with the compression-side ports 2d. In addition, the opening of the passage 9 may be displaced from the above-described position, and a passage area of the passage 9 may be increased or decreased toward the hollow space 80. Furthermore, for example, two or more passages 9 may be formed for a single island portion 8 by dividing the island portion 8 into three or more small islands by forming a plurality of recessed portions 8a for the single island portion 8. These modifications may be possible regardless of the height of the island portion 8.

In addition, the piston (the valve seat member) 2 in this embodiment forms the damping valve V together with at least one compression-side leaf valves (the leaf valves) 5 that are stacked on the piston 2 and the annular-shaped spacer member 50 that is stacked on the counter-piston side of the compression-side leaf valves 5. The outer diameter of the spacer member 50 is substantially the same as the outer diameter of the seat surface of the first seat 7a.

With the configuration described above, it is possible to arrange the tip end (the seat surface) of the island portion 8 at a position spaced apart from the deflection fulcrum of the compression-side leaf valves 5. Thus, when the compression-side leaf valves 5 are deflected, it is possible to form a sufficient gap between the compression-side leaf valves 5 and the island portion 8. Therefore, it is possible to prevent the contaminant from been caught between the island portion 8 and the compression-side leaf valves 5. In order to reliably achieve the above-described effects, although it is preferable that the outer diameter of the spacer member 50 be equal to or smaller than the outer diameter of the seat surface of the first seat 7a, the outer diameter of the spacer member 50 may be slightly larger than the outer diameter of the seat surface of the first seat 7a.

In addition, with the piston (the valve seat member) 2 in this embodiment, the compression-side ports 2d are configured so as to be the independent port type by the compression-side seat portion 7 on which the compression-side leaf valves 5 are seated, and the present invention is realized only in a portion of the compression-side seat portion 7. However, the present invention may also be realized, of course, on a portion of the extension-side seat portion 6 by configuring the extension-side ports 2c so as to be the independent port type by the extension-side seat portion 6. Furthermore, the number of the extension-side and compression-side ports 2c and 2d may, of course, be modified appropriately, and arrangement thereof may also be modified according to the format of the respective ports 2c and 2d.

In addition, the damping valve V including the piston (the valve seat member) 2 in this embodiment forms the shock absorber D together with the cylinder tube 1 and the piston rod 3 that is inserted into the cylinder tube 1 so as to be movable in the axial direction. The damping valve V imparts the resistance to the flow of the liquid that is formed when the cylinder tube 1 and the piston rod 3 are moved in the axial direction relative to each other. Thus, when the shock absorber D is extended/compressed and the cylinder tube 1 and the piston rod 3 are relatively moved in the axial direction, the damping force is exhibited by the resistance imparted by the damping valve V.

Furthermore, the damping valve V including the piston (the valve seat member) 2 in this embodiment is attached to the piston rod 3. However, the rod that moves into and out of the cylinder tube 1 may not necessarily be the piston rod attached with the piston, and the position for receiving the damping valve is not limited to a piston portion. For example, as described above, in a case in which the shock absorber is provided with a reservoir chamber and the volume compensation for the piston rod moving into and out of the cylinder tube is achieved in the reservoir chamber, the damping valve may be provided in an intermediate position of a passage through which an interior of the cylinder tube is communicated with the reservoir chamber.

In addition, the valve including the piston (the valve seat member) 2 in this embodiment may not necessarily be used for generating the damping force. Specifically, the leaf valves stacked on the valve seat member according to the present invention may function as a check valve, and the valve formed by having the valve seat member, the leaf valves, and the spacer member may be used as the valve for controlling the direction of the flow of the liquid.

Although the embodiments of the present invention have been described in the above, the above-mentioned embodiment merely illustrates a part of application examples of the present invention, and the technical scope of the present invention is not intended to be limited to the specific configurations of the above-described embodiment.

The present application claims a priority based on Japanese Patent Application No. 2018-066714 filed on Mar. 30, 2018 in the Japan Patent Office, the entire contents of which are incorporated herein by reference.

The invention claimed is:

1. A valve seat member having a seat surface, comprising:
   a main body portion having a port, the port opening at a one end portion of the main body portion;
   a first seat projecting out from the one end portion of the main body portion, the first seat being spaced apart from the opening of the port;
   a second seat projecting out from the one end portion of the main body portion, surrounding the opening of the port, and having two opposite ends in a circumferential direction of the main body portion, each of the two opposite ends of the second seat being connected to the first seat;
   an island portion disposed within an area surrounded by the first seat and the second seat and at a position closer to the first seat than is the opening such that a hollow space is formed between the island portion and the first seat; and
   a passage formed in the island portion, and being configured to allow communication between the port and the hollow space, wherein
   the island portion projects out from the one end portion of the main body portion, and has a tip end that is disconnected and spaced apart from each of the first seat and the second seat at the seat surface.

2. The valve seat member according to claim 1, wherein a gap is formed between the island portion and the second seat.

3. The valve seat member according to claim 1, wherein the island portion projects out from an end surface of the one end portion of the main body portion at which the port opens, the seat surface being formed by a tip end of the first seat and a tip end of the second seat both projecting out from the end surface, the tip end of the island portion being positioned at the seat surface or closer to the end surface than is the seat surface.

4. The valve seat member according to claim 3, wherein a height of the island portion from the end surface at which the port opens is equal to or lower than a height of the first seat from the end surface, and the height of the island portion is equal to or lower than a height of the second seat from the end surface.

5. The valve seat member according to claim 1, wherein the tip end of the island portion has a recess that forms the passage.

6. The valve seat member according to claim 1, wherein an opening of the passage to the hollow space faces a center between joint portions in which the two opposite ends of the second seat are respectively connected to the first seat.

7. The valve seat member according to claim 1, wherein a side surface of the island portion facing the opening of the port is flush with an inner wall of the port that is continuous with the side surface.

8. A valve, comprising:
   the valve seat member according to claim 1;
   at least one leaf valve stacked on the first seat and the second seat by being stacked on the valve seat member; and
   an annular-shaped spacer member stacked on the at least one leaf valve at a side opposite to a side in which the first and second seats are disposed, wherein
   the first seat has an annular shape and has an annular-shaped seat surface on which the at least one leaf valve is seated, and
   an outer diameter of the spacer member is equal to or smaller than an outer diameter of the seat surface.

9. A shock absorber, comprising:
   a cylinder tube;
   a rod inserted into the cylinder tube so as to be movable in an axial direction; and
   a valve, including:
      the valve seat member according to claim 1;
      at least one leaf valve stacked on the first seat and the second seat by being stacked on the valve seat member; and
      an annular-shaped spacer member stacked on the at least one leaf valve at a side opposite to a side in which the first and second seats are disposed, wherein
      the first seat has an annular shape and has an annular-shaped seat surface on which the at least one leaf valve is seated, and an outer diameter of the spacer member is equal to or smaller than an outer diameter of the seat surface, wherein
   the at least one leaf valve generates resistance against a flow of a liquid that is generated when the cylinder tube and the rod are moved in the axial direction relative to each other.

10. The valve seat member according to claim 1, wherein the port opens at an end surface of the one end portion of the main body portion, and the end surface forms a bottom surface of the hollow space,
    the first seat has a first tip end that forms the seat surface,
    the second seat has a second tip end that forms the seat surface together with the first tip end of the first seat, and
    the tip end of the island portion is disconnected from both the first seat and the second seat at a plane, which is orthogonal to an axial direction of the main body portion, and which is located at any height above the end surface of the one end portion of the main body portion in the axial direction.

11. The valve seat member according to claim 1, wherein the first seat has a first tip end that forms the seat surface, the second seat has a second tip end that forms the seat surface together with the first tip end of the first seat, and the first tip end of the first seat and the second tip end of the second seat are connected to each other at the seat surface.

12. The valve seat member according to claim 1, wherein the first seat has a first tip end that forms the seat surface, the second seat has a second tip end that forms the seat surface together with the first tip end of the first seat, and the first tip end of the first seat and the second tip end of the second seat together surround the island portion in a plan view of the valve seat member.

13. The valve seat member according to claim 12, wherein an entire inner periphery formed by the first and second tip ends is apart from an outer periphery of the island portion in the plan view.

* * * * *